US012799376B2

(12) United States Patent
Choi et al.

(10) Patent No.: US 12,799,376 B2
(45) Date of Patent: Nov. 17, 2026

(54) ADHESIVE COMPOSITION CONTAINING ANTISTATIC AGENT AND SURFACE PROTECTIVE FILM

(71) Applicant: LG CHEM, LTD., Seoul (KR)

(72) Inventors: Jeong Min Choi, Daejeon (KR); Jang Soon Kim, Daejeon (KR); Hyun Goo Kang, Daejeon (KR); Jae Seung Lym, Daejeon (KR)

(73) Assignee: XINMEI FONTANA HOLDING (HONG KONG) LIMITED, Hong Kong (CN)

( * ) Notice: Subject to any disclaimer, the term of this patent is extended or adjusted under 35 U.S.C. 154(b) by 530 days.

(21) Appl. No.: 18/021,803

(22) PCT Filed: Aug. 13, 2021

(86) PCT No.: PCT/KR2021/010784
§ 371 (c)(1),
(2) Date: Feb. 16, 2023

(87) PCT Pub. No.: WO2022/039447
PCT Pub. Date: Feb. 24, 2022

(65) Prior Publication Data

US 2023/0323171 A1 Oct. 12, 2023

(30) Foreign Application Priority Data

Aug. 18, 2020 (KR) ........................ 10-2020-0103552

(51) Int. Cl.
*C09J 175/04* (2006.01)
*C09J 7/25* (2018.01)
(Continued)

(52) U.S. Cl.
CPC ............... *C09J 175/04* (2013.01); *C09J 7/25* (2018.01); *C09J 7/50* (2018.01); *C09J 11/06* (2013.01);
(Continued)

(58) Field of Classification Search
CPC ..... C09J 175/04; C09J 7/25; C09J 7/50; C09J 11/06; C09J 11/08; C09J 2301/312;
(Continued)

(56) References Cited

U.S. PATENT DOCUMENTS

| | | | | |
|---|---|---|---|---|
| 2013/0017392 A1* | 1/2013 | Inao | .................. | C08G 18/4825 428/336 |
| 2020/0343479 A1* | 10/2020 | Choi | ...................... | H10K 59/40 |
| 2024/0010875 A1* | 1/2024 | Choi | .................... | C08G 18/755 |

FOREIGN PATENT DOCUMENTS

| | | |
|---|---|---|
| CN | 108384474 A | 8/2018 |
| JP | 2002235052 A * | 8/2002 |

(Continued)

OTHER PUBLICATIONS

Machine translation of JP 2002-235052 A (Year: 2002).*

(Continued)

*Primary Examiner* — Callie E Shosho
*Assistant Examiner* — Steven A Rice
(74) *Attorney, Agent, or Firm* — Ricky Lam

(57) ABSTRACT

An adhesive composition and a surface protective film using the same are provided. The adhesive composition comprises a urethane resin containing a hydroxyl group; an isocyanate-based curing agent; a (meth)acrylate copolymer of a monomer mixture including a (meth)acrylate monomer containing a hydroxyl group, a (meth)acrylate monomer containing a fluorine based substituent, an alkyl (meth)acrylate monomer having an alkyl group of 1 to 10 carbon atoms and an alkyl (Continued)

(meth)acrylate monomer having an alkyl group of 12 to 22 carbon atoms; and an antistatic agent.

9 Claims, 1 Drawing Sheet

(51) Int. Cl.
*C09J 7/50* (2018.01)
*C09J 11/06* (2006.01)
*C09J 11/08* (2006.01)

(52) U.S. Cl.
CPC .......... *C09J 11/08* (2013.01); *C09J 2301/312* (2020.08); *C09J 2301/414* (2020.08)

(58) Field of Classification Search
CPC ............ C09J 2301/414; C09J 2203/318; C09J 2433/00; C09J 2475/00; C09J 7/30; C09J 7/29; C09J 7/22; C09J 7/40; B32B 2250/24; B32B 2255/26; B32B 2307/748; B32B 7/12; B32B 27/08; B32B 2255/10; B32B 27/36; C08L 33/066; C08L 33/04; C08G 18/6279; C08G 18/725; C08G 18/755; C08G 18/791; C08G 18/792; C08K 3/017; C08K 5/29; C08K 2201/017
USPC .......................................................... 428/41.8
See application file for complete search history.

(56) References Cited

FOREIGN PATENT DOCUMENTS

| | | | | | |
|---|---|---|---|---|---|
| JP | 2006077140 | A | * | 3/2006 | |
| JP | 2013189562 | A | | 9/2013 | |
| JP | 5356661 | B2 | | 12/2013 | |
| JP | 2018053212 | A | | 4/2018 | |
| JP | 2018058952 | A | * | 4/2018 | |
| JP | 2018123282 | A | | 8/2018 | |
| JP | 2019089937 | A | | 6/2019 | |
| JP | 2019167440 | A | | 10/2019 | |
| JP | 2020-90586 | A | | 6/2020 | |
| KR | 20090017405 | A | | 2/2009 | |
| KR | 10-2013-0031033 | A | | 3/2013 | |
| KR | 10-2013-0080596 | A | | 7/2013 | |
| KR | 10-2015-0058003 | A | | 5/2015 | |
| KR | 10-1628435 | B1 | | 6/2016 | |
| KR | 20170034636 | A | * | 3/2017 | ............ C09J 133/16 |
| KR | 10-1737863 | B1 | | 5/2017 | |
| KR | 10-2017-0115434 | A | | 10/2017 | |
| KR | 10-2018-0090735 | A | | 8/2018 | |
| KR | 10-2035869 | B1 | | 10/2019 | |
| KR | 20190141320 | A | | 12/2019 | |
| KR | 10-2020-0004732 | A | | 1/2020 | |
| KR | 20200068604 | A | | 6/2020 | |
| KR | 20200073813 | A | | 6/2020 | |
| KR | 10-2020-0092895 | A | | 8/2020 | |
| TW | 201335324 | A | | 9/2013 | |
| TW | 201610051 | A | | 3/2016 | |
| WO | 2015016029 | A1 | | 3/2017 | |
| WO | WO-2019083255 | A2 | * | 5/2019 | ............. H01L 51/56 |

OTHER PUBLICATIONS

Machine translation of JP 2006-077140 A (Year: 2006).*
Machine translation of KR 10-2017/0034636 A (Year: 2017).*
Machine translation of JP 2018-123282 A (Year: 2018).*
Machine translation of JP 2018-058952 A (Year: 2018).*

* cited by examiner

ADHESIVE COMPOSITION CONTAINING ANTISTATIC AGENT AND SURFACE PROTECTIVE FILM

CROSS CITATION WITH RELATED APPLICATION(S)

This application is a National Stage Application of International Application No. PCT/KR2021/010784, filed on Aug. 13, 2021, which claims priority to Korean Patent Application No. 10-2020-0103552 filed on Aug. 18, 2020, the disclosures of which are incorporated herein by reference in their entirety.

FIELD

The present disclosure relates to an adhesive composition and a surface protective film. Specifically, the present disclosure relates to an adhesive composition and a surface protective film, which exhibit reduced migration of an antistatic agent to an adherend.

BACKGROUND

During the process of manufacturing an OLED, it is necessary to prevent an encapsulation layer on a panel surface from being damaged by external contaminants and external stimuli until a plastic OLED panel is bonded to a touch part after manufacturing of the plastic OLED panel. To protect the encapsulation layer, a process protective film for thin film encapsulation (TFE) is generally used during the plastic OLED manufacturing process.

This process protective film usually includes a substrate layer and an adhesive layer, and a release film for protecting the surface of the adhesive layer is laminated thereon. After the release film is peeled off from the process protective film having the release film laminated thereon, the process protective film is laminated so that the adhesive layer comes into contact with the surface of an adherend such as an electronic component whose surface needs to be protected during the process. Thereafter, the process protective film is peeled off from the adherend if protection is no longer is required after the process and another process should be performed.

This process protective film is a film that is laminated on the upper surface of the OLED panel to protect the OLED device. The process protection film needs to have an antistatic function in order to prevent damage to the OLED device from being caused by static electricity generated upon contact with manufacturing equipment or capable of occurring when peeling off the laminated protective film and to prevent panel malfunction from being caused by fines charges due to any residual static electricity, and needs to exhibit a low peeling electrification voltage when peeling off the release film therefrom.

In addition, since the process protective film is a film that is used temporarily to protect an electronic component during the manufacturing process, it needs to have excellent wettability on the adherend and exhibit low peel force and a low residue level when the protective film is removed to perform an additional process, should not leave contaminants after peeling, and should not cause electrostatic damage to the adherend upon peeling. Accordingly, the adhesive layer needs to have high antistatic properties.

A method of adding an antistatic agent to an adhesive has been proposed to satisfy such antistatic properties, but a problem arises in that the antistatic agent migrates to the adherend under an environment of high temperature and high humidity, causing surface contamination.

SUMMARY

The technical problem to be solved by the present disclosure is to provide an adhesive composition and a surface protective film, which leave a low level of residue, have low peeling force, and prevent the migration of an antistatic agent contained therein.

According to one aspect of the present disclosure, there is provided an adhesive composition containing a urethane resin containing a hydroxyl group, an isocyanate-based curing agent, a (meth)acrylate copolymer, and an antistatic agent, wherein the (meth)acrylate copolymer is obtained by polymerization from a monomer mixture which contains a (meth)acrylate monomer containing a hydroxyl group, a (meth)acrylate monomer containing a fluorine based substituent, an alkyl (meth)acrylate monomer having an alkyl group of 1 to 10 carbon atoms and an alkyl (meth)acrylate monomer having an alkyl group of 12 to 22 carbon atoms.

According to another aspect of the present disclosure, there is provided a surface protective film including a release film and a substrate film, wherein the substrate film includes: a first substrate layer; an antistatic layer positioned on at least one surface of the first substrate layer; and an adhesive layer including a cured product of the adhesive composition, and the release film and the adhesive layer are in direct contact with each other.

The adhesive composition according to one embodiment of the present disclosure is effective in that it may be easily peeled off from the adherend due to its low adhesiveness, and does not leave residue on the adherend surface, and the antistatic agent does not migrate to the adherend, suggesting that the adhesive composition does not contaminate the adherent surface.

The surface protective film according to another embodiment of the present disclosure is effective in that it may be easily peeled off from the adherend due to its low adhesiveness, and does not leave residue on the adherend surface, and the antistatic agent does not migrate to the adherend, suggesting that the surface protective film does not contaminate the adherent surface.

DETAILED DESCRIPTION

Figure 1:
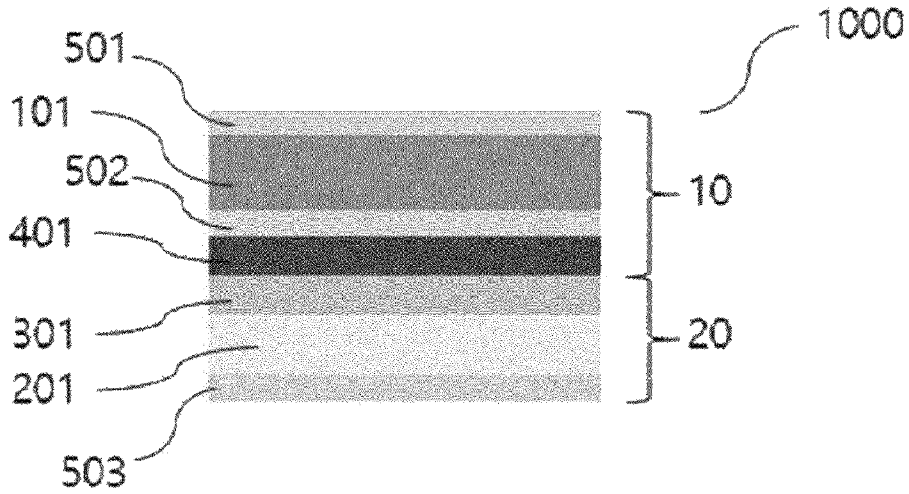
FIG. 1 is a schematic sectional view of a surface protective film according to an embodiment of the present disclosure.

Throughout the present specification, it is to be understood that when any part is referred to as "including" any component, it does not exclude other components, but may further include other components, unless otherwise specified.

In the present specification, the term "weight-average molecular weight" means the molecular weight in terms of polystyrene measured by gel permeation chromatography (GPC) using, as standards, monodispersed polystyrenes (standard samples) having various polymerization degrees, which are commercially available as standards for molecular weight measurement. The weight-average molecular weight is given in units of g/mol. In the present specification, the term “molecular weight” refers to a weight-average molecular weight, unless specified otherwise.

In this specification, the term “antistatic layer” means a layer intended to suppress the generation of static electricity.

Hereinafter, the present disclosure will be described in more detail.

According to one embodiment of the present disclosure, there is provided an adhesive composition containing a urethane resin containing a hydroxyl group, an isocyanate-based curing agent, a (meth)acrylate copolymer, and an antistatic agent, wherein the (meth)acrylate copolymer is obtained by polymerization from a monomer mixture which contains a (meth)acrylate monomer containing a hydroxyl group, a (meth)acrylate monomer containing a fluorine based substituent, an alkyl (meth)acrylate monomer having an alkyl group of 1 to 10 carbon atoms and an alkyl (meth)acrylate monomer having an alkyl group of 12 to 22 carbon atoms.

The adhesive composition according to one embodiment of the present disclosure may be applied to and cured on an adherend to form an adhesive layer. The adhesive layer may be easily peeled off due to the low peel force thereof, leaves less adhesive residue on the adherend surface, exhibits reduced migration of the antistatic agent to the adherend surface, and thus may be peeled off without contaminating the adherend surface.

(1) Urethane Resin

The adhesive composition according to one embodiment of the present disclosure may contain a urethane resin as a main component. The expression “contain a urethane resin as a main component” means that the urethane resin is contained in the adhesive composition in an amount of about 50 wt % or more, which may be larger than the contents of the other components.

The urethane resin contained in the adhesive composition according to one embodiment of the present disclosure is not particularly limited, but may be a polyurethane polyol resin or polyurethane prepolymer polyol obtained by polymerizing a mixture for urethane production containing a polyol and a polyfunctional isocyanate.

As the raw material polyol for producing the polyurethane polyol resin, one type of polyol may be used, or two or more types of polyols may be used together. In addition, as the raw material polyol, a bifunctional polyol and a trifunctional or higher polyol may be used together, and in this case, one or more bifunctional polyols and one or more trifunctional or higher polyols may be used together.

Examples of the raw material polyol include ethylene glycol, diethylene glycol, 1,3-butanediol, 1,4-butanediol, neopentyl glycol, 3-methyl-1,5-pentanediol, 2-butyl-2-ethyl-1,3-propanediol, 2,4-diethyl-1,5-pentanediol, 1,2-hexanediol, 1,6-hexanediol, 1,8-octanediol, 1,9-nonanediol, 2-methyl-1,8-octanediol, 1,8-decanediol, octadecanediol, glycerin, trimethylolpropane, pentaerythritol, hexanetriol, polypropylene glycol, and the like. Examples of an acid component that may be used include succinic acid, methyl succinic acid, adipic acid, pimelic acid, azelaic acid, sebacic acid, 1,12-dodecanoic acid, 1,14-tetradecanoic acid, dimer acid, 2-methyl-1,4-cyclohexanedicarboxylic acid, 2-ethyl-1,4-cyclohexanedicarboxylic acid, terephthalic acid, isophthalic acid, phthalic acid, 1,4-naphthalenedicarboxylic acid, 4,4'-biphenyldicarboxylic acid , and acid anhydrides thereof.

In addition, the raw material polyol may contain at least one of polyester polyol, polyether polyol, polycaprolactone polyol, and polycarbonate polyol. Specific examples thereof include, but not limited to, those described below.

Examples of the polyether polyol include polyether polyols obtained by addition polymerization of alkylene oxide (e.g., ethylene oxide, propylene oxide, butylene oxide, etc.) to initiators such as water; low-molecular-weight polyols such as propylene glycol, ethylene glycol, glycerin, trimethylolpropane, or pentaerythritol; bisphenols such as bisphenol A; or dihydroxybenzenes such as catechol, resorcin, or hydroquinone. Specific examples of the polyether polyol include polyethylene glycol, polypropylene glycol, polytetramethylene glycol, and the like.

Examples of the polycaprolactone polyol include caprolactone-based polyesterdiols obtained by ring-opening polymerization of cyclic ester monomers such as ε-caprolactone or σ-valerolactone.

Examples of the polycarbonate polyol include: polycarbonate polyol obtained by polycondensation reaction between the polyol component and phosgene; polycarbonate polyol obtained by transesterification polycondensation of the polyol component with diester carbonate such as dimethyl carbonate, diethyl carbonate, dipropyl carbonate, diisopropyl carbonate, dibutyl carbonate, ethyl butyl carbonate, ethylene carbonate, propylene carbonate, diphenyl carbonate, or dibenzyl carbonate; copolymerized polycarbonate polyol obtained by using two or more of the polyol components in combination; polycarbonate polyol obtained by esterifying the above-listed polycarbonate polyol with a carboxyl group-containing compound; polycarbonate polyol obtained by etherifying the above-listed polycarbonate polyol with a hydroxyl group-containing compound; polycarbonate polyol obtained by transesterifying the above-listed polycarbonate polyol with an ester compound; polycarbonate polyol obtained by transesterifying the above-listed polycarbonate polyol with a hydroxyl group-containing compound; polyester-based polycarbonate polyol obtained by polycondensation reaction of the above-listed polycarbonate polyol with a dicarboxylic acid compound; and copolymerized polyether-based polycarbonate polyol obtained by copolymerizing the above-listed polycarbonate polyol with alkylene oxide.

The number-average molecular weight of the raw material polyol contained in the mixture for urethane production may be appropriately selected. In one embodiment, the number-average molecular weight of the polyol may be appropriately 100 to 40,000, but is not limited thereto.

As the polyfunctional isocyanate compound, any suitable polyfunctional isocyanate compound that may be used in a urethanation reaction may be employed. Examples of this polyfunctional isocyanate compound include a polyfunctional aliphatic isocyanate compound, a polyfunctional alicyclic isocyanate compound, and a polyfunctional aromatic isocyanate compound.

Examples of the polyfunctional isocyanate compound include, but are not limited to, polyfunctional aliphatic isocyanate, polyfunctional alicyclic isocyanate and polyfunctional aromatic isocyanate compounds, a trimethylolpropane adduct obtained by modifying polyisocyanate with trifunctional isocyanate, a biuret body obtained by reacting polyisocyanate with water, a trimer having an isocyanurate ring, and the like.

Examples of the polyfunctional aliphatic isocyanate compound include, but are not limited to, trimethylene diisocyanate, tetramethylene diisocyanate, pentamethylene diisocyanate, hexamethylene diisocyanate, 1,2-propylene diisocyanate, 1,3-butylene diisocyanate, dodecamethylene diisocyanate, 2,4,4-trimethylhexamethylene diisocyanate, and the like.

Examples of the polyfunctional alicyclic isocyanate compound include, but are not limited to, isophorone diisocyanate (IPDI), 1,4-cyclohexanediisocyanate (CHDI), 4,4'-dicyclohexylmethane diisocyanate (HMDI), bis (isocyanatomethyl) cyclohexane (HXDI), and the like.

Examples of the polyfunctional aromatic isocyanate compound include, but are not limited to, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PDI), m-phenylene diisocyanate (PDI), naphthalene 1,5-diisocyanate (NDI), naphthalene 2,4-diisocyanate (NDI), p-xylylene diisocyanate (XDI), 1,3-bis(1-isocyanato-1-methylethyl)benzene (TMXDI), and the like.

In one embodiment of the present disclosure, as the polyfunctional isocyanate compound, two or more isocyanate compounds may be used in combination, and in this case, the types and contents of the two or more isocyanate compounds may be appropriately selected. For example, as the isocyanate compound contained in the mixture for urethane production, a polyfunctional aromatic isocyanate compound and a polyfunctional aliphatic isocyanate compound may be used in combination.

The urethane resin may contain a hydroxyl group. As the urethane resin contains a hydroxyl group, the hydroxyl group of the urethane resin may serve as a crosslinking point when the adhesive composition is formed into the adhesive layer, that is, when the adhesive composition is cured to form the adhesive layer. Thus, when the polyurethane polyol resin produced from the polyol and the polyfunctional isocyanate is used as the urethane resin as described above, the polyurethane polyol resin is preferably produced using the polyol and the polyfunctional isocyanate so that the ratio of the number of moles of isocyanate groups of the polyfunctional isocyanate (NCO) to the number of moles of hydroxyl groups (OH) of the polyol, (NCO/OH), is less than 1.

The weight-average molecular weight of the urethane resin may be 50,000 to 200,000, or 100,000 to 150,000. When a urethane resin having a weight-average molecular weight within the above range is used, the cohesiveness and adhesiveness of the adhesive layer may be appropriately controlled.

The urethane resin may be contained in an amount of 60 wt % or more, preferably 70 to 90 wt %, 75 to 90 wt %, 80 to 90 wt %, or 84 to 90 wt %, based on the total weight of the adhesive composition. That is, the urethane resin is a main component of the adhesive composition and may be contained in the adhesive composition in an amount within the above range.

Appropriate additives may be used in the process of producing the urethane resin. For example, the urethane resin may be produced by adding an antioxidant, a UV absorber, a light stabilizer, an anti-degradation agent, and the like, and the types and contents of the additives may be appropriately determined according to the intended use. Preferably, the urethane resin may be produced to contain anti-degradation agents such as an antioxidant, a UV absorber and a light stabilizer.

In addition, any suitable catalyst may be used in the process of producing the urethane resin. Examples of this catalyst include a tertiary amine-based compound and an organometallic compound. Examples of the organometallic compound include a tin-based compound, a non-tin-based compound, etc.

Examples of the tin-based compound include dibutyltin dichloride, dibutyltin oxide, dibutyltin dibromide, dibutyltin dimaleate, dibutyltin dilaurate (DBTDL), dibutyltin diacetate, dibutyltin sulfide, tributyltin sulfide, tributyltin oxide, tributyltin acetate, triethyltin ethoxide, tributyltin ethoxide, dioctyltin oxide, tributyltin chloride, tributyltin trichloroacetate, and 2-ethyltin hexanoate.

(2) Curing Agent

The isocyanate-based curing agent is added to crosslink and cure the urethane resin and (meth)acrylate copolymer contained in the adhesive composition. Specifically, a curing agent containing an isocyanate group that reacts with a hydroxyl group contained in each of the urethane resin and the (meth)acrylate copolymer may crosslink the urethane resin and the (meth)acrylate copolymer.

As the isocyanate-based curing agent, any suitable polyfunctional isocyanate compound that is commonly used in the art may be selected and used as long as it is a compound that may be used for a urethanation reaction. In addition, at least one polyfunctional isocyanate compound selected from among examples listed below may be used as the isocyanate-based curing agent.

Examples of the polyfunctional isocyanate compound include, but are not limited to, polyfunctional aliphatic isocyanate, polyfunctional alicyclic isocyanate and polyfunctional aromatic isocyanate compounds, a trimethylolpropane adduct obtained by modifying polyisocyanate with trifunctional isocyanate, a biuret body obtained by reacting polyisocyanate with water, a trimer having an isocyanurate ring, and the like.

Examples of the polyfunctional aliphatic isocyanate compound include, but are not limited to, trimethylene diisocyanate, tetramethylene diisocyanate, pentamethylene diisocyanate, hexamethylene diisocyanate, 1,2-propylene diisocyanate, 1,3-butylene diisocyanate, dodecamethylene diisocyanate, 2,4,4-trimethylhexamethylene diisocyanate, and the like.

Examples of the polyfunctional alicyclic isocyanate compound include, but are not limited to, isophorone diisocyanate (IPDI), 1,4-cyclohexanediisocyanate (CHDI), 4,4'-dicyclohexylmethane diisocyanate (HMDI), bis (isocyanatomethyl) cyclohexane (HXDI), and the like.

Examples of the polyfunctional aromatic isocyanate compound include, but are not limited to, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PDI), m-phenylene diisocyanate (PDI), naphthalene 1,5-diisocyanate (NDI), naphthalene 2,4-diisocyanate (NDI), p-xylylene diisocyanate (XDI), 1,3-bis(1-isocyanato-1-methylethyl)benzene (TMXDI), and the like.

The isocyanate-based curing agent may be contained in an amount of 10 to 30 parts by weight based on 100 parts by weight of the urethane resin. When the curing agent is contained in an amount within the above range, the adhesive composition may be cured to have an appropriate level of hardness while the curing reaction may smoothly proceed, so that the cured product of the adhesive composition may exhibit an appropriate level of adhesiveness.

The ratio of the number of moles of isocyanate groups of the isocyanate-based curing agent to the number of moles of hydroxyl groups of the urethane resin may be 5.0 or less. When the isocyanate-based curing agent is added so as to have a ratio of the number of moles within the above range, the adhesive composition may exhibit low peel force due to a high degree of curing because it contains few unreacted isocyanate groups.

(3) (Meth)acrylate Copolymer

The adhesive composition according to one embodiment of the present disclosure solves the above-described problem by containing a (meth)acrylate copolymer obtained by copolymerization from a mixture containing specific monomers. Specifically, the (meth)acrylate copolymer contains a hydroxyl group by including a polymerization unit of a (meth)acrylate monomer containing a hydroxyl group, and also contains two types of hydrophobic groups by including a polymerization unit of a (meth)acrylate monomer containing a long-chain alkyl group and a polymerization unit of a (meth)acrylate monomer containing a fluorine based substituent. The long-chain alkyl group is a hydrocarbon chain corresponding to a hydrophobic group, and the fluorine based substituent corresponds to a hydrophobic group because it has a fluorine replacing a portion or all of the hydrogen atoms attached to the carbon atoms of the alkyl group bonded to the ester of acrylate and thus may have hydrophobicity comparable to that of the long-chain alkyl group. The (meth)acrylate copolymer may float to the outer surface portion of the adhesive layer by the hydrophobic group in the process of producing the adhesive layer from the adhesive composition, and low peel force may be achieved by the hydrophobic group of the (meth)acrylate copolymer located on the outer surface portion of the adhesive layer, that is, the surface that adheres to the adherend in direct contact therewith. In addition, the hydroxyl group of the (meth)acrylate copolymer may react with the isocyanate-based curing agent and act as a crosslinking site that is crosslinked with the urethane resin, thereby achieving low peel force. Due to the two types of hydrophobic groups and the hydroxyl group, the adhesive layer including the adhesive composition may have excellent durability even in a high-temperature and high-humidity environment, and even if the adhesive composition contains a plasticizer or a peel force controlling agent, it is possible to prevent the plasticizer or the peel force controlling agent from migrating from the surface of the adhesive layer to the adherend surface and contaminating the adherend surface.

In addition, the hydroxyl group of the (meth)acrylate copolymer may react with the isocyanate-based curing agent and act as a crosslinking site that is crosslinked with the urethane resin, thereby achieving low peel force, and may prevent contamination of the adherend surface by preventing the antistatic agent from migrating from the surface of adhesive layer to the adherend surface. Due to the two types of hydrophobic groups and the hydroxyl group, the adhesive layer including the adhesive composition may have excellent durability even in a high-temperature and high-humidity environment, and even if the adhesive composition contains a plasticizer or a peel force controlling agent, it is possible to prevent the plasticizer or the peel force controlling agent from migrating from the surface of the adhesive layer to the adherend surface and contaminating the adherend surface.

The (meth)acrylate copolymer may have a weight-average molecular weight of 20,000 to 70,000. When the (meth) acrylate copolymer having a weight-average molecular weight within the above range is contained in the adhesive composition, it may be positioned on the surface of the adhesive layer when the adhesive composition is applied, thereby controlling the peel force of the adhesive layer and the degree of curing of the adhesive composition.

The (meth)acrylate copolymer is obtained by polymerization from a monomer mixture. Specifically, the (meth) acrylate copolymer may be obtained from a monomer mixture by various polymerization methods which are commonly used, such as solution polymerization, bulk polymerization, suspension polymerization, emulsion polymerization, and radiation curing polymerization.

The monomer mixture contains is a (meth)acrylate monomer containing a hydroxyl group, a (meth)acrylate monomer containing a fluorine substitute, an alkyl (meth)acrylate monomer having an alkyl group of 1 to 10 carbon atoms, and an alkyl (meth)acrylate monomer having an alkyl group of 12 to 22 carbon atoms.

The monomer mixture may contain more than 0 to not more than 10 wt % of the (meth)acrylate monomer containing a hydroxyl group. The content of the (meth)acrylate monomer containing a hydroxyl group may be controlled in consideration of the hydroxyl value of the (meth)acrylate copolymer to be obtained by polymerization, and where the (meth)acrylate copolymer is produced by polymerizing a monomer mixture which contains the (meth)acrylate monomer containing a hydroxyl group in an amount within the above content range, it is possible to prepare an adhesive composition having an appropriate peel force and excellent wettability.

The (meth)acrylate monomer containing a hydroxyl group may include one or more selected from the group consisting of 2-hydroxyethyl (meth)acrylate, 2-hydroxypropyl (meth)acrylate, 4-hydroxybutyl (meth)acrylate, 6-hydroxyhexyl (meth) acrylate, 8-hydroxyoctyl (meth) acrylate, 2-hydroxyethylene glycol (meth)acrylate, and 2-hydroxypropylene glycol (meth) acrylate.

The monomer mixture may contain more than 0 to not more than 10 wt % of the (meth)acrylate monomer containing a fluorine based substituent. The polymerization unit of the fluorine based substituent-containing (meth)acrylate monomer may correspond to the hydrophobic group in the (meth)acrylate copolymer. Where the (meth)acrylate copolymer is produced by polymerizing a monomer mixture containing the fluorine based substituent-containing (meth) acrylate monomer in an amount within the above range, it is possible to control the peel force of the adhesive layer within an appropriate range.

The fluorine based substituent-containing (meth)acrylate monomer may include one or more selected from the group consisting of trifluoroethyl (meth)acrylate, tetrafluoro-n-propyl (meth) acrylate, tetrafluoro-t-pentyl (meth) acrylate, hexafluorobutyl (meth) acrylate, hexafluoro-t-hexyl (meth) acrylate, hexafluoro-2,4-bis(trifluoromethyl)pentyl (meth) acrylate, hexafluoroisopropyl (meth) acrylate, heptafluorobutyl (meth) acrylate, octafluoropentyl (meth) acrylate, nonafluoropentyl (meth) acrylate, dodecafluoroheptyl (meth) acrylate, dodecafluorooctyl (meth) acrylate, tridecafluorooctyl (meth) acrylate, tridecafluoroheptyl (meth) acrylate, hexadecafluorodecyl (meth) acrylate, heptadecafluorodecyl (meth) acrylate, octadecafluoroundecyl (meth)acrylate, nonadecafluoroundecyl (meth)acrylate, and eicosafluorododecyl (meth) acrylate.

The monomer mixture may contain 70 to 95 wt % of the alkyl (meth)acrylate monomer having an alkyl group of 1 to carbon atoms and 1 to 10 wt % of the alkyl (meth)acrylate monomer having an alkyl group of 12 to 22 carbon atoms. That is, the monomer mixture contains a short-chain alkyl (meth)acrylate monomer and a long-chain alkyl (meth) acrylate monomer, and in particular, the polymerization unit of the long-chain alkyl (meth)acrylate monomer may correspond to another hydrophobic group in the (meth)acrylate copolymer. Where the (meth)acrylate copolymer is produced by polymerizing the monomer mixture containing the alkyl (meth)acrylate monomers in amounts within the above ranges, an adhesive layer formed by curing the adhesive composition containing the (meth)acrylate copolymer may have an appropriate peel force.

The alkyl (meth)acrylate monomer having an alkyl group of 1 to 10 carbon atoms may include one or more selected from the group consisting of methyl (meth)acrylate, ethyl (meth)acrylate, n-propyl (meth)acrylate, isopropyl (meth) acrylate, n-butyl (meth)acrylate, t-butyl (meth)acrylate, sec-butyl (meth)acrylate, pentyl (meth) acrylate, 2-ethylhexyl (meth) acrylate, 2-ethylbutyl (meth) acrylate, n-octyl (meth) acrylate, isooctyl (meth)acrylate, and isononyl (meth)acrylate.

The alkyl (meth)acrylate monomer having an alkyl group of 12 to 22 carbon atoms may include one or more selected from the group consisting of lauryl (meth)acrylate, tetradecyl (meth)acrylate, stearyl (meth)acrylate, cetyl (meth) acrylate, behenyl (meth)acrylate, and eicosyl (meth) acrylate.

The monomer mixture may further contain other monomer components polymerizable with the (meth)acrylate monomers within a range that does not impair the effects of the present disclosure. For example, the monomer mixture may further contain (meth)acrylate monomers such as aromatic (meth)acrylate monomers and other (meth)acrylate monomers, the contents of which may be controlled as necessary. Examples of the other monomer components include, but not limited to, those described below.

Examples of the aromatic (meth)acrylate monomers include, but are not limited to, orthobiphenyl (meth)acrylate, metabiphenyl (meth) acrylate, parabiphenyl (meth) acrylate, 2,6-terphenyl (meth) acrylate, orthoterphenyl (meth) acrylate, meta-terphenyl (meth) acrylate, para-terphenyl (meth) acrylate, 4-(4-methylphenyl)phenyl (meth)acrylate, 4-(2-methylphenyl)phenyl (meth)acrylate, 2-(4-methylphenyl) phenyl (meth) acrylate, 2-(2-methylphenyl)phenyl (meth) acrylate, 4-(4-ethylphenyl)phenyl (meth)acrylate, 4-(2-ethylphenyl)phenyl (meth)acrylate, 2-(4-ethylphenyl) phenyl (meth)acrylate, and 2-(2-ethylphenyl) phenyl (meth) acrylate.

Examples of the other (meth)acrylate monomers include, but are not limited to, cyclohexyl (meth)acrylate, phenoxy (meth) acrylate, 2-ethylphenoxy (meth) acrylate, benzyl (meth)acrylate, phenyl (meth)acrylate, 2-ethylthiophenyl 2,2-methylphenylethyl (meth) acrylate, 2,3-methylphenylethyl (meth)acrylate, 2,4-methylphenylethyl (meth)acrylate, 2-(4-propylphenyl)ethyl (meth)acrylate, 2-(4-(1-methylethyl)phenyl)ethyl (meth)acrylate, 2-(4-methoxyphenyl) ethyl (meth) acrylate, 2-(4-cyclohexylphenyl)ethyl (meth) acrylate, 2-(2-chlorophenyl)ethyl (meth)acrylate, 2-(3-chlorophenyl)ethyl (meth)acrylate, 2-(4-chlorophenyl)ethyl (meth)acrylate, 2-(4-bromophenyl)ethyl (meth) acrylate, 2-(3-phenylphenyl)ethyl (meth)acrylate, and 2-(4-benzylphenyl)ethyl (meth) acrylate.

The (meth)acrylate copolymer may be contained in an amount of 0.5 to 5 parts by weight, 0.5 to 3 parts by weight, 1 to 3 parts by weight, 1 to 2.5 parts by weight, or 1.5 to 2.5 parts by weight, based on 100 parts by weight of the urethane resin. Where the (meth)acrylate copolymer is contained in an amount within the above range, an adhesive layer formed by curing the adhesive composition may have an appropriate peel force.

(4) Antistatic Agent

The adhesive composition according to one embodiment of the present disclosure contains an antistatic agent. The antistatic agent may prevent electrostatic adsorption of dust or the like by lowering the surface resistance of the surface protective film.

The antistatic agent may be appropriately selected from among those that can achieve a desired surface resistance. According to one embodiment of the present disclosure, the antistatic agent may include at least one of ionic compounds, conductive fine particles, and conductive polymers.

The ionic compounds include an ionic compound having an organic cation; and an ionic compound having an inorganic cation.

Examples of the ionic compound having an organic cation include 1-butylpyridiniume tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethanesulfonyl)imide, 1-butyl-3-methylpyridinium bis(pentafluoroethanesulfonyl)imide, 1-butyl-4-methylpyridinium hexafluorophosphate, 1-hexylpyridinium tetrafluoroborate, 1-hexylpyridinium hexafluorophosphate, 1-octylpyridinium hexafluorophosphate, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonyl)imide, 1-ethyl-3-methylimidazolium tris(trifluoromethanesulfonyl)imide, 1-butyl-3-methylimidazolium methanesulfonate, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium perfluorobutanesulfonate, 1-butyl-3-methylimidazolium bis(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl)imide, 1-ethyl-3-methylimidazolium hexafluorophosphate, 1-ethyl-3-methylidazolium-p-toluenesulfonate, 1-methylpyrazolium tetrafluoroborate, 3-methylpyrazolium tetrafluoroborate, 1-butyl-1-methylpyrrolidinium hexafluorophosphate, tetrabutylammonium hexafluorophosphate, tetrabutylammonium-p-toluenesulfonate, tetrahexylammonium bis(trifluoromethanesulfonyl)imide, N,N-diethyl-N-methyl-N-(2-methoxyethyl)ammonium tetrafluoroborate, N,N-diethyl-N-methyl-N-(2-methoxyethyl)ammonium bis(trifluoromethanesulfonyl) imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl) imide, glycidyltrimethylammonium trifluoromethanesulfonate, glycidyltrimethylammonium bis(trifluoromethanesulfonyl)imide, glycidyldiyltrimethylammonium bis (pentafluoroethanesulfonyl)imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl)trifluoroacetamide, diallyldimethylammonium (trifluoromethanesulfonyl)trifluoroacetamide, glycidyltrimethylammonium (trifluoromethanesulfonyl)trifluoroacetamide, N,N-dimethyl-N-ethyl-N-propylammonium bis(trifluoromethanesulfonyl)imide, N,N-dimethyl-N-ethyl-N-butylammonium bis(trifluoromethanesulfonyl)imide, N,N-dimethyl-N-ethyl-N-pentylammonium bis (trifluoromethanesulfonyl)imide, N,N-dimethyl-N-ethyl-N-hexylammonium bis(trifluoromethanesulfonyl)imide, N,N-dimethyl-N-ethyl-N-heptylammonium bis (trifluoromethanesulfonyl)imide, N,N-dimethyl-N-ethyl-N-nonylammonium bis(trifluoromethanesulfonyl)imide, N,N-dimethyl-N,N-dipropylammonium bis (trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis (trifluoromethanesulfonyl)imide, N,N-dimethyl-N-butyl-N-hexylammonium bis(trifluoromethanesulfonyl)imide, N,N-dimethyl-N-butyl-N-heptylammonium bis (trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl) imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis (trifluoromethanesulfonyl)imide, N,N-diethyl-N-methyl-N-heptylammonium bis(trifluoromethanesulfonyl)imide, N,N-diethyl-N-propyl-N-pentylammonium bis (trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl) imide, N,N-dipropyl-N-methyl-N-pentylammonium bis (trifluoromethanesulfonyl)imide, N,N-dipropyl-N-butyl-N-hexylammonium bis(trifluoromethanesulfonyl)imide, N,N-dipropyl-N,N-dihexylammonium bis (trifluoromethanesulfonyl)imide, N,N-dibutyl-N-methyl-N-pentylammonium bis(trifluoromethanesulfonyl)imide, N,N-dibutyl-N-methyl-N-hexylammonium bis (trifluoromethanesulfonyl)imide, trioctylmethylammonium bis(trifluoromethanesulfonyl)imide, trioctylmethylammonium hexafluorophosphate, N-methyl-N-ethyl-N-propyl-N-pentylammonium bis(trifluoromethanesulfonyl)imide, (2-hydroxyethyl) trimethylammonium bis(trifluoromethanesulfonyl)imide, hydroxyethyl) trimethylammonium potassium (2-dimethylphosphinate, bis(fluorosulfonyl)imide, sodium bis(fluorosulfonyl)imide, lithium bis(fluorosulfonyl)imide, potassium bis(trifluorosulfonyl)imide, sodium bis(trifluorosulfonyl)imide, lithium bis(trifluorosulfonyl) imide, and tributylmethylammonium bis(trifluoromethanesulfonyl)imide.

The ionic compound having an inorganic cation is not particularly limited, and examples thereof include lithium bromide, lithium iodide, lithium tetrafluoroborate, lithium hexafluorophosphate, lithium thiocyanate, lithium perchlorate, lithium trifluoromethanesulfonate, lithium bis(trifluoromethanesulfonyl)imide, lithium bis(pentafluoroethanesulfonyl)imide, and lithium tris(trifluoromethanesulfonyl) methid.

(5) Additives

The adhesive composition according to one embodiment of the present disclosure may contain other additives in addition to the above-described components. For example, the adhesive composition may further contain a solvent, a catalyst, a curing retardant, an adhesive resin, a plasticizer, a photoinitiator, a hydrolysis inhibitor, an antioxidant, a curing accelerator, an anti-retardation agent, etc. depending on the intended use, and the contents of these additives may also be appropriately selected.

According to one embodiment of the present disclosure, the adhesive composition may further contain a solvent. As the solvent, there may be used a known appropriate solvent, for example, but not limited to, a ketone-based solvent, an acetate-based solvent, or a toluene-based solvent.

According to one embodiment of the present disclosure, the adhesive composition may further contain a catalyst. The catalyst may be appropriately selected in consideration of the purpose of the present application, and for example, it may be contained in an amount of 10 ppm to 500 ppm based on the urethane polymer. As the catalyst, a tin-based catalyst such as dibutyltin dilaurate (DBTDL), a lead-based catalyst, salts of organic and inorganic acids, an organometallic derivative, an amine-based catalyst, a diazabicycloundecene-based catalyst, or the like may be used, but the catalyst is not limited thereto.

According to one embodiment of the present disclosure, the adhesive composition may further contain a curing retardant. As the curing retardant, any suitable known material may be used, and the content of the curing retardant may be appropriately selected. In one embodiment, acetyl acetone may be used as the curing retardant.

According to another embodiment of the present disclosure, there is provided a surface protective film including a release film and a substrate film, wherein the substrate film includes: a first substrate layer; an antistatic layer positioned on at least one surface of the first substrate layer; and an adhesive layer including a cured product of the adhesive composition, and the release film and the adhesive layer are in direct contact with each other.

The surface protective film serves to protect an adherend such as an electronic component during a process and includes a release film that is removed before attachment of the surface protective film to the adherend. In addition, the surface protective film includes a substrate film, which is attached to the adherend and serves to protect the adherend surface. The substrate film is peeled off from the adherend surface later.

Figure 2:
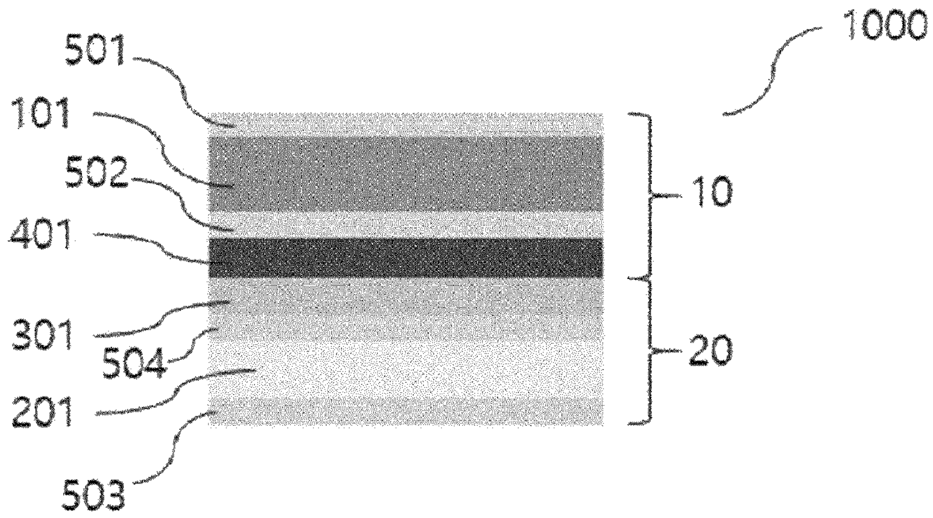
FIG. 2 is a schematic sectional view of a surface protective film according to another embodiment of the present disclosure.

FIGS. 1 and 2 are schematic sectional views showing surface protective films according to embodiments of the present disclosure. Referring to FIGS. 1 and 2, a surface protective film 1000 includes a release film 10 and a substrate film 20, and the substrate film 20 may include a first substrate layer 201, an antistatic layer(s) 503 (504), and an adhesive layer 301.

(a) Substrate Film

The substrate film may include a first substrate layer; an antistatic layer positioned on at least one surface of the first substrate layer; and an adhesive layer including a cured product of the adhesive composition.

The first substrate layer may serve to maintain the shape of the substrate film, and may include, but is not limited to, at least one selected from the group consisting of: polyethylene terephthalate; polytetrafluoroethylene; polyethylene; polypropylene; polybutene; polybutadiene; a vinyl chloride copolymer; polyurethane; ethylene-vinyl acetate; an ethylene-propylene copolymer; an ethylene-ethyl acrylate copolymer; an ethylene-methyl acrylate copolymer; polyimide; nylon; a styrene-based resin or elastomer; a polyolefin-based resin or elastomer; other elastomers; a polyoxyalkylene-based resin or elastomer; a polyester-based resin or elastomer; a polyvinyl chloride-based resin or elastomer; a polycarbonate-based resin or elastomer; a polyphenylene sulfide-based resin or elastomer; mixtures of hydrocarbons; a polyamide-based resin or elastomer; an acrylate-based resin or elastomer; an epoxy-based resin or elastomer; a silicone-based resin or elastomer; and liquid crystal polymers.

The thickness of the first substrate layer may be appropriately selected in consideration of the purpose of the present disclosure. For example, the thickness of the first substrate layer may be 25 μm to 150 μm, 50 μm to 125 μm, or 50 μm to 100 μm.

The antistatic layer may be positioned on at least one surface of the first substrate layer, that is, one surface or both surfaces thereof.

The antistatic layer may be formed by a known method in order to achieve a desired effect. For example, the antistatic layer may be formed on one or both surfaces of the first substrate layer by an in-line coating method. The in-line coating method is a method of uniaxially stretching an extruded film, and then applying a coating layer thereto, followed by biaxial stretching, thus obtaining a finished film. The in-line coating method has advantages in that, since coating is performed during the film production process, the adhesion between the coating layer and the film is increased, and since the application of the coating layer is continuously performed together with film production, the process is shortened, and the film may be produced to have the smallest possible thickness.

In the present disclosure, the antistatic layer may be formed of an appropriate antistatic composition in consideration of the purpose of the present disclosure. For example, the antistatic layer may include a thermosetting binder resin in a range that does not affect the effects of the present disclosure.

As used herein, the term "thermosetting binder resin" refers to a binder resin that can be cured through an appropriate heating or aging process. For example, as the thermosetting binder resin, one or a mixture of two or more selected from the group consisting of acrylic resin, urethane-based resin, a urethane-acrylic copolymer, ester-based resin, ether-based resin, amide-based resin, epoxy-based resin, and melamine resin may be used, but the thermosetting binder resin is not limited thereto.

In one example, the antistatic layer may include a conductive material. The conductive material may include, but is not limited to, a conductive polymer or carbon nanotubes.

Examples of the conductive polymer include, but are not limited to, a polyaniline-based polymer compound, a polypyrrole-based polymer compound, a polythiophene-based polymer compound, and derivatives and copolymers thereof.

The carbon nanotube may have a tubular shape formed by rolling up graphite sheets composed of hexagonal rings of six carbon atoms bound together. The carbon nanotubes have excellent rigidity and electrical conductivity, and thus when the carbon nanotubes are included in the antistatic layer, the hardness of the antistatic layer may increase and the antistatic performance thereof may be enhanced.

The thickness of each antistatic layer may independently be 600 nm or less, or 10 nm to 400 nm, preferably 20 nm to 300 nm, or 20 nm to 100 nm.

The adhesive layer includes a cured product of the adhesive composition. Details regarding the adhesive composition may be the same as described above.

The adhesive layer may be formed by applying and curing the adhesive composition on the surface of the first substrate layer. The method of curing the adhesive composition is not particularly limited, and for example, there may be used a method of curing the adhesive composition by an appropriate drying, heating and/or aging process, or a method of curing the adhesive composition by irradiation with electromagnetic waves such as ultraviolet (UV) light.

Where the antistatic layer is positioned on a surface of the first substrate layer, which is opposite to the adhesive layer, the adhesive layer may be produced by applying the adhesive composition to the surface of the antistatic layer in the same manner as described above.

The thickness of the adhesive layer may be appropriately selected in consideration of the purpose of the present disclosure. For example, the thickness of the adhesive layer may be 10 μm or more, 30 μm or more, or 45 μm or more. For example, the thickness of the adhesive layer may be 200 μm or less, 150 μm or less, 100 μm or less, or 90 μm or less.

(b) Release Film

The release film may include: a second substrate layer; an antistatic layer positioned on at least one surface of the second substrate layer; and a release layer.

According to one embodiment of the present disclosure, the release film serves to protect the adhesive layer of the substrate film until the surface protective film is attached to an electronic component.

Referring to FIGS. 1 and 2, the surface protective film 1000 may include the release film 10 and the substrate film 20, and the release film 10 may include a second substrate layer 101, antistatic layers 501 and 502, and a release layer 401.

The second substrate layer of the release film may include, but is not limited to, at least one selected from the group consisting of: polyethylene terephthalate; polytetrafluoroethylene; polyethylene; polypropylene; polybutene; polybutadiene; a vinyl chloride copolymer; polyurethane; ethylene-vinyl acetate; an ethylene-propylene copolymer; an ethylene-ethyl acrylate copolymer; an ethylene-methyl acrylate copolymer; polyimide; nylon; a styrene-based resin or elastomer; a polyolefin-based resin or elastomer; other elastomers; a polyoxyalkylene-based resin or elastomer; a polyester-based resin or elastomer; a polyvinyl chloride-based resin or elastomer; a polycarbonate-based resin or elastomer; a polyphenylene sulfide-based resin or elastomer; mixtures of hydrocarbons; a polyamide-based resin or elastomer; an acrylate-based resin or elastomer; an epoxy-based resin or elastomer; a silicone-based resin or elastomer; and liquid crystal polymers.

The thickness of the second substrate layer may be appropriately selected in consideration of the purpose of the present disclosure. For example, the thickness of the second substrate layer may be 25 μm to 150 μm, 25 μm to 125 μm, or 25 μm to 100 μm.

Details regarding on the antistatic layer included in the release film may be the same as described above with respect to the antistatic layer of the substrate film.

The material of the release layer may be appropriately selected depending on the purpose of the present disclosure. As the release layer, a conventional polymer film known in the art to which the present disclosure pertains may be used. For example, a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film, or a polyimide film may be used, but the release layer is not limited thereto.

The thickness of the release layer may be appropriately selected in consideration of the purpose of the present disclosure. For example, the thickness of the release layer may be 500 nm or less, preferably 10 nm to 500 nm, 10 nm to 300 nm, or 10 nm to 200 nm.

The adhesive layer of the surface protective film according to one embodiment of the present disclosure may have a surface resistivity of $10^{12}$ Ω/□ or less, or $10^{11}$ Ω/□ or less. Where the adhesive layer has the surface resistivity within the above range, the surface protective film may have excellent antistatic properties.

Specifically, where the surface protective film includes the antistatic layer on one surface of the first substrate layer, more specifically, where the surface protective film includes the antistatic layer on a surface of the first substrate layer, which is not in contact with the adhesive layer, the adhesive layer may have a surface resistivity of $10^{12}$ Ω/□ or less. Where the surface protective film includes the antistatic layers on both surfaces of the first substrate layer, each of the adhesive layers may have a surface resistivity of $10^{11}$ Ω/□ or less. As the antistatic layer is included, the surface resistivity may vary, and whether or not the antistatic layer is included and the number of antistatic layers included may be determined according to the intended use.

The surface protective film according to one embodiment of the present disclosure may have a peel force of 4 gf/in or less, more than 0 to not more than 3 gf/in, or more than 0 to not more than 2 gf/in, as measured by peeling off the surface protective film from a glass at a peel angle of 180° at a peel speed of 0.3 m/min. Where surface protective film has a peel force within the above range, the surface protective film may be removed without damage to the adherend when the surface protective film is peeled off from the adherend after attachment to the adherend and completion of a process.

Hereinafter, the present disclosure will be described in detail with reference to examples. However, the examples according to the present disclosure may be modified into various different forms, and the scope of the present disclosure is not interpreted as being limited to the examples described below. The examples of the present specification are provided to more completely explain the present disclosure to those skilled in the art.

EXAMPLES

Example 1

A monomer mixture containing 87 parts by weight of butyl methacrylate, 7 parts by weight of stearyl methacrylate, 3 parts by weight of hydroxybutyl acrylate, and 3 parts by weight of tridecafluorooctyl acrylate was introduced into a 1-L reactor, containing refluxed nitrogen gas and equipped with a cooling device for easy temperature adjustment, and then toluene as a solvent was introduced thereinto. After the mixture was uniformly mixed, the reactor temperature was maintained at 120 °C, and benzoyl peroxide (BPO) as a reaction initiator was added to the mixture in an amount of 1.5 parts by weight based on 100 parts by weight of the monomer mixture, followed by reaction for about 4 hours. After completion of the reaction, the reaction solution was additionally diluted with toluene, thus producing a (meth) acrylate copolymer having a weight-average molecular weight of 28,000 g/mol.

An adhesive composition was prepared by mixing 100 parts by weight of a urethane resin (weight-average molecular weight: 120,000; SH-101, Toyochem Co., Ltd.) with 1.5 parts by weight of the (meth)acrylate copolymer, 0.05 parts by weight of a pyridinium-based antistatic agent (IL-P14, Koei Chem Co., Ltd.) and 15 parts by weight of a mixture containing an isocyanurate isocyanate trimer and an isophorone diisocyanate at a weight ratio of 7:3 (DR7030X, Samyoung Ink Co., Ltd.) as a polyfunctional isocyanate curing agent.

A 75-μm-thick PET film having an antistatic layer provided on one surface thereof was prepared. The adhesive composition was applied onto a surface of the PET film, which was not in contact with the antistatic layer of the PET film, and then dried at 140 °C for about 3 minutes to form an adhesive layer having a thickness of 75 μm, and a release film (RF02ASW, SKC) was laminated onto the adhesive layer. Thereafter, the resulting film structure was aged in an oven at 40 °. for about 5 days, thereby producing a surface protective film.

Examples 2 and 3

Surface protective films were produced in the same manner as in Example 1, except that the components and their contents were changed as shown in Table 1 below.

TABLE 1

| | Cation of antistatic agent | Content (parts by weight) of antistatic agent | (Meth)acrylate copolymer (parts by weight) |
|---|---|---|---|
| Example 1 | Pyridinium | 0.05 | 1.5 |
| Example 2 | Pyridinium | 0.1 | 1.5 |
| Example 3 | Ammonium | 0.05 | 1.5 |

Comparative Example 1

A surface protective film was produced in the same manner as in Example 1, except that 0.05 parts by weight of an ammonium-based antistatic agent (FC4400, 3M Co., Ltd.) as an antistatic agent was added and 60 parts by weight of acetyl tributyl citrate (ATBC, Asahi Kasei Co., Ltd.) as a peel force controlling agent was used instead of 1.5 parts by weight of the (meth)acrylate copolymer.

Example 4

A surface protective film was produced in the same manner as in Example 1, except that a PET film having antistatic layers provided on both surfaces thereof was used instead of the PET film having an antistatic layer provided on one surface thereof.

Examples 5 to 7

Surface protective films were produced in the same manner as in Example 4, except that the composition was changed as shown in Table 2 below.

TABLE 2

| | Cation of antistatic agent | Content (parts by weight) of antistatic agent | (Meth)acrylate copolymer (parts by weight) |
|---|---|---|---|
| Example 4 | Pyridinium | 0.05 | 1.5 |
| Example 5 | Pyridinium | 0.1 | 1.5 |
| Example 6 | Ammonium | 0.01 | 1.5 |
| Example 7 | Ammonium | 0.05 | 1.5 |

Comparative Example 2

A surface protective film was produced in the same manner as in Example 4, except that 0.1 parts by weight of an ammonium-based antistatic agent (FC4400, 3M Co., Ltd.) as an antistatic agent was added and 60 parts by weight of acetyl tributyl citrate (ATBC, Asahi Kasei Co., Ltd.) as a peel force controlling agent was used instead of 1.5 parts by weight of the (meth)acrylate copolymer.

Comparative Example 3

A surface protective film was produced in the same manner as in Example 1, except for the following. A monomer mixture containing 87 parts by weight of butyl methacrylate, 7 parts by weight of stearyl methacrylate and 6 parts by weight of hydroxybutyl acrylate was introduced into a 1-L reactor, containing refluxed nitrogen gas and equipped with a cooling device for easy temperature adjustment, and then toluene as a solvent was introduced thereinto. After the mixture was uniformly mixed, the reactor temperature was maintained at 120 °C, and benzoyl peroxide (BPO) as a reaction initiator was added to the mixture in an amount of 1.5 parts by weight based on 100 parts by weight of the monomer mixture, followed by reaction for about 4 hours. After completion of the reaction, the reaction solution was additionally diluted with toluene, thus producing a (meth)acrylate copolymer having a weight-average molecular weight of 28,000 g/mol.

Comparative Example 4

A surface protective film was produced in the same manner as in Example 1, except that an adhesive composition was prepared by mixing 100 parts by weight of a urethane resin with 7.5 parts by weight of the (meth)acrylate copolymer.

Comparative Example 5

A surface protective film was produced in the same manner as in Example 1, except that an adhesive composition was prepared by mixing 100 parts by weight of a urethane resin with 10 parts by weight of the (meth)acrylate copolymer.

Experimental Example 1: Measurement of Peel Force on Glass

The surface protective film produced in each of Examples 1 to 7 and Comparative Examples 1 to 5 was cut to size of 25 mm (width)×250 mm (length), and the release film was peeled off therefrom. The adhesive surface of each surface protective film from which the release film has been peeled off was cleaned with ethanol and attached by a 2-kg roller to glass (Corning) dried at 100 °C for 20 minutes. Next, the resulting materials were stored at a temperature of 50 °C and 5 atm for 20 minutes, and then stored at a temperature of 25 °C for 24 hours. Thereafter, the peel force of each surface protective film when peeling off from the glass at a peel speed of 0.3 m/min and a peel angle of 180° was measured using a texture analyzer (Stable Micro Systems Inc. UK).

Example 2: Measurement of Surface Resistivity of Adhesive Layer

The surface protective film produced in each of Examples 1 to 7 and Comparative Examples 1 to 5 was cut to size of 10 cm (width)×10 cm (length), and the release film was peeled off therefrom. Using a surface resistivity meter (Hiresta-UP MCP-HT450, Mitsubishi Chemical Co.), the electrode of the meter was pressed down against the adhesive surface of each surface protective film, from which the release film has been peeled off, with a pressure of 2 kgf, and then the surface resistivity of the adhesive layer after 10 seconds was measured while a voltage of 100 V was applied at a temperature of 25 °C. Specifically, the surface resistivities of the center of the adhesive layer and two points 2.5 cm apart from the center of the adhesive layer in the width direction of the adhesive layer were measured for seconds, and the three surface resistivity values were averaged.

Experimental Example 3: Evaluation of Residue of Antistatic Agent after Storage in High-Temperature and High-Humidity Environment The surface protective film produced in each of Examples 1 to 7 and Comparative Examples 1 to 5 was cut to size of 15 cm (width)×15 cm (length), and the release film was peeled off therefrom. The adhesive surface of each surface protective film from which the release film has been peeled off was attached to glass by a means of a 2-kg roller, and the resulting materials were stored at a temperature of 60 °C and a relative humidity of 90% for 10 days, and then stored at 25 °C for 1 day. Next, each surface protective film was peeled off and removed from the glass, and then the surface resistivity of the glass surface from which the adhesive layer has been removed after attachment was measured to evaluate the residue of the antistatic agent. Specifically, the surface resistivity value after 10 seconds was measured while a voltage of 1,000 V was applied to the glass surface.

Table 3 below shows the results of measuring the peel force of each of the surface protective films of Examples 1 to 7 and Comparative Examples 1 to 5, the surface resistivity of the adhesive layer of each surface protective film, and the surface resistivity of the glass after film peeling following storage in the high-temperature and high-humidity environment.

TABLE 3

| | Peel force (gf/in) on glass | Surface resistivity ($*10^{10}$ Ω/□) of adhesive layer | Surface resistivity ($*10^{12}$ Ω/□) of glass after storage in high-temperature and high-humidity environment |
|---|---|---|---|
| Example 1 | 2.3 | 6.18 | — |
| Example 2 | 2.1 | 2.89 | — |
| Example 3 | 2.2 | 9.21 | — |
| Comparative Example 1 | 1.3 | 8.12 | 6.29 |
| Example 4 | 2.3 | 0.627 | — |
| Example 5 | 2.1 | 0.173 | — |

TABLE 3-continued

| | Peel force (gf/in) on glass | Surface resistivity (*10$^{10}$ Ω/□) of adhesive layer | Surface resistivity (*10$^{12}$ Ω/□) of glass after storage in high-temperature and high-humidity environment |
|---|---|---|---|
| Example 6 | 2.2 | 0.912 | — |
| Example 7 | 2.0 | 0.358 | — |
| Comparative Example 2 | 1.2 | 0.420 | 8.50 |
| Comparative Example 3 | 4.5 | 2.53 | — |
| Comparative Example 4 | 0.4 | 9.89 | 4.54 |
| Comparative Example 5 | 0.4 | 11.2 | 1.24 |

Referring to Table 3 above, it can be confirmed that the surface protective films of Examples 1 to 7 had excellent antistatic properties, because the surface resistivity of the adhesive layer was low while the peel force thereof on the glass was low, and that the adhesive layer in each Example left almost no residue on the glass even after storage in the high-temperature and high-humidity environment, suggesting that the surface resistivity of the glass was very high and thus was not measurable.

On the other hand, it could be confirmed that Comparative Examples 1 and 2 showed low peel force and surface resistivity values similar to those of the Examples, but the antistatic agent remained on the glass surface after storage in the high-temperature and high-humidity environment, and thus the surface resistivity of the glass was measurably lower than that of each Example, suggesting that the residue of the antistatic agent was present on the glass, and thus the surface protective films of Comparative Examples 1 and 2 contaminated the surface of the adherend.

It can be confirmed that the surface protective film of Comparative Example 3 has a problem that it may be difficult to peel off from the adherend because the peel force thereof on the glass is high, and in the case of Comparative Examples 4 and 5, the antistatic agent remained on the glass surface after storage in the high-temperature and high-humidity environment, and thus the surface resistivity of the glass was measurably lower than that of each Example, suggesting that the residue of the antistatic agent was present on the glass, and thus the surface protective films contaminated the surface of the adherend.

That is, when an excessive amount of the (meth)acrylate copolymer is added, the degree of curing of the adhesive composition is lowered, and large amounts of the (meth) acrylate copolymer and the antistatic agent on the surface of the adhesive layer may migrate to the adherend surface, thereby contaminating the adherend surface.

DESCRIPTION OF REFERENCE NUMERALS

1000: surface protective film
10: release film
20: substrate film
101: second substrate layer
201: first substrate layer
301: adhesive layer
401: release layer
501, 502, 503, 504: antistatic layer

The invention claimed is:

1. An adhesive composition comprising:
a urethane resin containing a hydroxyl group;
an isocyanate-based curing agent;
a (meth)acrylate copolymer; and
an antistatic agent, wherein the antistatic agent is an ionic antistatic agent,
wherein the (meth)acrylate copolymer is a copolymer of a monomer mixture including:
(i) 0.1 to 10 wt % of a (meth)acrylate monomer containing a hydroxyl group,
(ii) 0.1 to 5 wt % of a (meth)acrylate monomer containing a fluorine-based substituent,
(iii) 80 to 95 wt % of an alkyl (meth)acrylate monomer having an alkyl group of 1 to 10carbon atoms, and
(iv) 1 to 10 wt % of an alkyl (meth)acrylate monomer having an alkyl group of 12 to 22 carbon atoms,
wherein the (meth)acrylate copolymer is contained in an amount of 0.5 to 5 parts by weight based on 100 parts by weight of the urethane resin;
wherein an adhesive layer formed from the adhesive composition exhibits a surface resistivity of $10^6$ to $10^{11}$ Ω/□ and a surface protective film comprising the adhesive layer formed from the adhesive composition exhibits a peel force of 4 gf/in or less when peeled from glass at a peel angle of 180° and a peel speed of 0.3 m/min;
and the ionic antistatic agent has no migration to a surface of the glass after storage at 60 °C and 90% relative humidity for 10 days;
wherein the (meth)acrylate copolymer has a weight-average molecular weight of 20,000 to 70,000;
wherein the (meth)acrylate copolymer is capable of migrating toward the surface of the adhesive layer;
wherein the (meth) acrylate copolymer participates in crosslinking with the urethane resin;
wherein the isocyanate-based curing agent is contained in an amount of 10 to 30 parts by weight based on 100 parts by weight of the urethane resin.

2. The adhesive composition of claim 1, wherein the urethane resin has a weight-average molecular weight of 50,000 to 200,000.

3. The adhesive composition of claim 1, wherein the (meth)acrylate monomer containing a hydroxyl group comprises one or more selected from the group consisting of 2-hydroxyethyl (meth)acrylate, 2-hydroxypropyl (meth) acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, and 2-hydroxypropylene glycol (meth)acrylate.

4. The adhesive composition of claim 1, wherein the (meth)acrylate monomer containing fluorine-based substituent comprises one or more selected from the group consisting of trifluoroethyl (meth)acrylate, tetrafluoro-n-propyl (meth)acrylate, tetrafluoro-t-pentyl (meth)acrylate, hexafluorobutyl (meth)acrylate, hexafluoro-t-hexyl (meth) acrylate, hexafluoro-2,4-bis(trifluoromethyl)pentyl (meth) acrylate, hexafluoroisopropyl (meth)acrylate, heptafluorobutyl (meth)acrylate, octafluoropentyl (meth)acrylate, nonafluoropentyl (meth)acrylate, dodecafluoroheptyl (meth) acrylate, dodecafluorooctyl (meth)acrylate, tridecafluorooctyl (meth)acrylate, tridecafluoroheptyl (meth)acrylate, hexadecafluorodecyl (meth)acrylate, heptadecafluorodecyl (meth)acrylate, octadecafluoroundecyl (meth)acrylate, nonadecafluoroundecyl (meth)acrylate, and eicosafluorododecyl (meth)acrylate.

5. The adhesive composition of claim 1, wherein the alkyl (meth)acrylate monomer having an alkyl group of 1 to 10 carbon atoms comprises one or more selected from the group consisting of methyl (meth)acrylate, ethyl (meth) acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth) acrylate, 2-ethylbutyl (meth)acrylate, n-octyl (meth)acrylate, isooctyl (meth)acrylate, and isononyl (meth)acrylate.

6. The adhesive composition of claim 1, wherein the alkyl (meth)acrylate monomer having an alkyl group of 12 to 22 carbon atoms comprises one or more selected from the group consisting of lauryl (meth)acrylate, tetradecyl (meth) acrylate, stearyl (meth)acrylate, cetyl (meth)acrylate, behenyl (meth)acrylate, and eicosyl (meth)acrylate.

7. A surface protective film comprising a release film and a substrate film, wherein the substrate film comprises:

a first substrate layer;

an antistatic layer positioned on at least one surface of the first substrate layer; and an adhesive layer comprising a cured product of the adhesive composition according to claim 1, and wherein the release film and the adhesive layer are in direct contact with each other.

8. The surface protective film of claim 7, wherein the release film comprises:

a second substrate layer;

an antistatic layer positioned on at least one surface of the second substrate; and a release layer.

9. The surface protective film of claim 7, which has a peel force of 4 gf/in or less as measured by peeling off the surface protective film from a glass at a peel angle of 180° and a peel speed of 0.3 m/min.

* * * * *